US006725278B1

(12) United States Patent
Gonzalez (10) Patent No.: US 6,725,278 B1
(45) Date of Patent: *Apr. 20, 2004

(54) SMART SYNCHRONIZATION OF COMPUTER SYSTEM TIME CLOCK BASED ON NETWORK CONNECTION MODES

(75) Inventor: Julio A. Gonzalez, San Jose, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/156,565

(22) Filed: Sep. 17, 1998

(51) Int. Cl.[7] .............................................. G06F 15/16
(52) U.S. Cl. ...................... 709/248; 709/217; 709/227
(58) Field of Search ................................ 709/238, 250, 709/248, 227, 228, 203, 206, 217, 239; 713/400; 711/5; 379/39.07, 100; 375/356, 354; 370/352, 337, 396, 424; 712/225; 714/48, 25; 707/10; 327/202; 345/339, 348

(56) References Cited

U.S. PATENT DOCUMENTS

| | | | | |
|---|---|---|---|---|
| 4,163,222 A | * | 7/1979 | Gove ........................... 341/26 |
| 4,631,666 A | * | 12/1986 | Harris et al. ................. 709/217 |
| 4,903,261 A | * | 2/1990 | Baran et al. ................. 370/396 |
| 4,953,185 A | * | 8/1990 | Goode ........................ 375/354 |
| 5,068,851 A | * | 11/1991 | Bruckert et al. .............. 714/25 |
| 5,109,483 A | * | 4/1992 | Baratz et al. ................. 709/227 |
| 5,404,394 A | * | 4/1995 | Dimolitsas et al. .......... 379/100 |
| 5,442,628 A | * | 8/1995 | ANderson et al. ........... 370/424 |
| 5,509,122 A | * | 4/1996 | Bartow et al. ............... 709/227 |
| 5,577,075 A | * | 11/1996 | Cotton et al. ............... 375/356 |
| 5,583,833 A | | 12/1996 | Capps et al. ................. 368/185 |
| 5,701,411 A | * | 12/1997 | Tran et al. ................... 709/250 |
| 5,764,920 A | * | 6/1998 | Cook et al. .................. 709/238 |
| 5,790,608 A | * | 8/1998 | Benayoun et al. ........... 375/365 |
| 5,842,007 A | * | 11/1998 | Tarsky et al. ................ 712/225 |
| 5,864,252 A | * | 1/1999 | Tran et al. ................... 327/202 |
| 5,874,959 A | * | 2/1999 | Rowe .......................... 345/339 |
| 5,896,523 A | * | 4/1999 | Bissett et al. ................ 713/400 |
| 5,917,894 A | * | 6/1999 | Minamizawa ............ 379/93.07 |
| 5,959,630 A | * | 9/1999 | Takeuchi et al. ............ 345/348 |
| 6,023,769 A | * | 2/2000 | Gonzalez ..................... 713/400 |

(List continued on next page.)

OTHER PUBLICATIONS

Savage et al, Real–Time Mach Timers: Exporting Time to the User, www.cs.washington.edu/homes/savage/papers/machnix93.ps.*

(List continued on next page.)

Primary Examiner—Marc D. Thompson
Assistant Examiner—Thong Vu
(74) Attorney, Agent, or Firm—Blakely, Sokoloff, Taylor & Zafman LLP (57) ABSTRACT

A method and apparatus are provided for performing synchronization of a time clock maintained by a computer system based on the network connection modes of the computer system. The technique allows the time clock of the computer system to be synchronized at the earliest opportunity that will not result in a disruption or inconvenience to the user. When synchronization of the time clock is required, and the computer system does not already have an active network connection, the computer system queries a configuration database to determine its default network connection mode. If the default connection mode is potentially user disruptive (e.g., use of a dial out modem is required), synchronization of the time clock is not performed until an active network connection has been established. If the default connection mode is not likely to be user-disruptive (e.g., doesn't require a modem connection), then a network connection is immediately established to synchronize the time clock.

34 Claims, 8 Drawing Sheets

U.S. PATENT DOCUMENTS

| | | | | |
|---|---|---|---|---|
| 6,061,784 | A | * 5/2000 | Tarsky et al. | 712/225 |
| 6,134,230 | A | * 10/2000 | Olofsson et al. | 370/337 |
| 6,157,957 | A | * 12/2000 | Berthaud | 709/248 |
| 6,170,067 | B1 | * 1/2001 | Liu et al. | 714/48 |
| 6,185,565 | B1 | * 2/2001 | Meubus et al. | 707/10 |
| 6,192,414 | B1 | * 2/2001 | HOrn | 709/239 |
| 6,272,127 | B1 | * 8/2001 | Golden et al. | 370/352 |
| 6,311,283 | B1 | * 10/2001 | Gonzalez | 713/400 |
| 6,349,328 | B1 | * 2/2002 | Haneda et al. | 709/206 |

OTHER PUBLICATIONS

Dunigan, Hypercube Synchronization, www.epm.ornl.gov/~dunigan/clock.ps.*

Verissimo, CesiumSpray: a Precise and Accurate Global Clock., www.di.fc.ul.pt/~ler/pubs/../reports/CesiumSpray.ps.gz.*

Levine, Time Synchronization Using the Internet, IEEE Mar. 1998.*

Mills, Internet Time Synchronization: The Network Time Protocol, IEEE Oct. 1991.*

"Vremya 2.0", Kirill Levchenko, Jun. 29, 1998, 2 pages.

Resnick, Pete, "Network Time", Version 2.0, 1990–1993, 8 pages.

Resnick, Pete, "A Program to Automatically Set the Time of Day on your Macintosh® Using the Apple® MacTCP® Network Software," *Network Time*, Version 2.0, 1990–1993, 22 pages.

Dundas III, John A., "NTP for Macintosh, Executive Overview", Revised Sep. 11, 1993, pp. 1–6.

Dundas III, John A., "NTP for Macintosh", Revised Sep. 11, 1993, pp. 1–8.

D. Mills, Simple Network Time Protocol (SNTP) Version 4 for IPv4, IPv6 and OSI, University of Delaware, Electrical Engineering Department, Oct. 1996, pp. 1–16.

* cited by examiner

SMART SYNCHRONIZATION OF COMPUTER SYSTEM TIME CLOCK BASED ON NETWORK CONNECTION MODES

FIELD OF THE INVENTION

The present invention pertains to the field of computer networks. More particularly, the present invention relates to synchronization of a time clock maintained by a computer system on a network.

BACKGROUND OF THE INVENTION

Most conventional computer systems maintain an internal clock to keep track of the time of day. Accurate time of day measurements are required in a wide variety of applications, such as managing and tracking electronic mail (email), timing back-ups of data on a network, synchronizing communications between clients and servers, and managing multimedia teleconferences. Because the time clocks maintained by most computer systems tend to be subject to a certain amount of error, or "drift", it becomes necessary to synchronize such clocks to an accurate reference clock from time to time, to maintain their accuracy.

Various solutions have been developed to synchronize the time clock of a computer system. A simple method is for the user of a computer system to manually adjust the clock whenever the clock appears to have drifted. This technique, however, is both inconvenient for the user and subject to its own inaccuracies. A more sophisticated solution makes use of a server computer system operating on a network, such as the Internet. The server maintains a highly accurate time clock, such as an atomic clock, and provides accurate time readings to other computer systems on the network using a communication protocol such as Network Time Protocol (NTP). A client computer system may send a request for an accurate time reading via the Internet to an NTP server when it is necessary to synchronize its internal clock. The request may be routed to one of a number of secondary servers that function as intermediaries between client systems requiring clock synchronization and a primary NTP server. The use of such secondary servers is intended to reduce the loading on the primary NTP server. A primary NTP server may be maintained, for example, by a government entity, such as the U.S. Navy, while access to the primary NTP server is regulated by secondary NTP servers maintained by universities and business enterprises, for use by their students and employees, respectively.

A problem that is associated with many NTP based clock synchronization techniques is that the secondary servers tend to become overloaded by synchronization requests, particularly those which serve large networks. A large business enterprise, for example, may maintain a secondary time server that serves hundreds or even thousands of client systems. Hence, the occurrence of a large number of synchronization requests within a short period of time may significantly slow down operation of the server. This effect is undesirable, particularly if the server is responsible for other vital services.

Other problems associated with prior clock synchronization techniques are inconvenience to the user and disruption of the user's activities. Synchronization of a computer system's time clock is typically performed under the control of network application software executing on the computer system, which operates the computer system's communication device to access a network time server. In a home environment, in which access to the Internet is typically provided through the use of a modem, the network software must perform a modem dial out routine to establish a connection to the Internet. It is undesirable for a computer system to initiate a dial out on its own whenever clock synchronization is required, as doing so may be disruptive to the user. Consequently, network software products are commonly configured to synchronize the time clock only when it is determined that an active network connection exists. This approach has the disadvantage that, in a home situation, the time clock is synchronized only when the user actually accesses the Internet, which may not be frequent enough to maintain the accuracy of the clock.

In a business ("enterprise") environment, it is common for a direct Internet connection to be provided to computer users, albeit through their company's local area network (LAN) or other private network, such that no dial out procedure is required. However, many network applications are designed to operate in either an enterprise situation or a home situation. Consequently, network software is often conservatively designed based on the assumption that establishing a network connection will be disruptive to the user. Hence, in an enterprise situation, the operating system is commonly polled to determine whether the network software is loaded, and synchronization of the clock is performed only when the network software is loaded. As a result, even in computing environments where establishing a network connection would not be disruptive to the user (e.g., environments which require no dial out), synchronization of the time clock may not occur as often as is necessary to maintain the clock's accuracy.

SUMMARY OF THE INVENTION

A method and apparatus for controlling synchronization of a clock maintained by a processing system are provided. It is first determined whether a network connection mode of the processing system is user transparent. If the network connection mode is determined not to be user transparent, then the network is accessed to synchronize the clock only when the processing system has an active connection to the network. If the connection mode is determined to be user transparent, then an active connection to the network is established to synchronize the clock.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for performing synchronization of a computer system time clock based on the computer system's network connection modes are described. The described method and apparatus allow the time clock of a computer system to be synchronized at the earliest opportunity that will not result in a disruption or inconvenience to the user, while avoiding unnecessary delays in synchronizing the clock. When synchronization of the time clock is required, and the computer system does not already have an active network connection, the computer system queries a configuration database to determine its default network connection mode. If the default connection mode is potentially user disruptive, synchronization of the time clock is not performed until an active network connection has been established. If the default connection mode is not likely to be user disruptive (i.e., is transparent to the user), then a network connection is immediately established to synchronize the time clock.

Figure 1A:
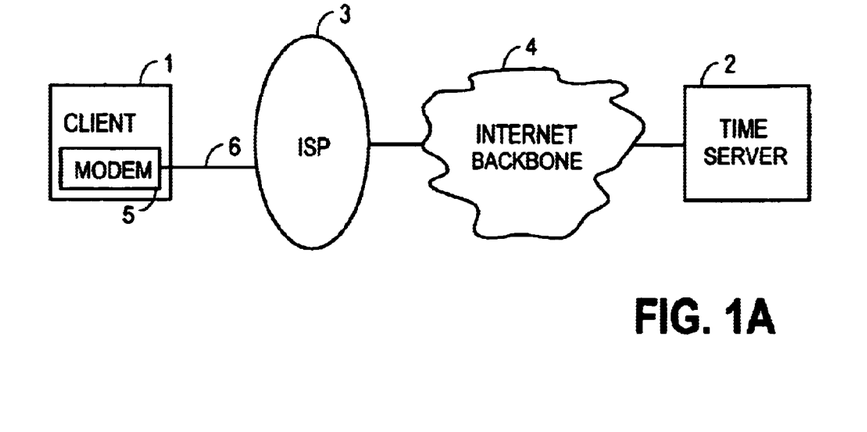
FIG. 1A illustrates a client computer system connected to a time server computer system via the Internet.

FIG. 1A illustrates a computer network configuration such as may be used by a typical home computer user. A client computer system 1 includes a conventional telephone (POTS) modem 5, which provides the client computer system 1 with a connection to a network time server 2 on the Internet. In particular, the modem 5 provides the client system 1 with a connection 6 to an Internet Service Provider (ISP) 3, which provides the client system 1 with a connection to the time server 2 via the Internet backbone 4. The time server 2 may be, for example, a primary or secondary NTP server. The configuration of FIG. 1A may be contrasted with that of FIG. 1B, which shows an example of an enterprise computing environment. Specifically, in FIG. 1B, multiple client computer systems 1 are associated with a particular business enterprise 8. Each of the multiple client computer systems 1 includes a network interface card (NIC) 7 that provides a connection 6 to a private LAN 9. The LAN 9, in turn, provides the client systems 1 with a connection to the time server 2 via the Internet backbone 4.

In a typical home environment as depicted in FIG. 1A, a user command may be required to initiate dial out of the modem 5 to access the time server 2. Accordingly, NTP clock synchronization according to the prior art generally is performed in this configuration only when an active network connection has already been established for some other purpose. In contrast, in an enterprise situation such as that of FIG. 1B, each of the client systems 1 already has a connection to the time server 2 via the LAN 9 and Internet backbone 4; for a client system 1 to access the Internet to synchronize its time clock, usually all that is necessary is for the client system to load its network protocol stack, which may be Transport Control Protocol (TCP), for example, and execute its network application software. Both of these actions are generally transparent to the user. However, prior art clock synchronization techniques generally wait at least until some other process has loaded the network protocol stack before accessing the network, even in the enterprise situation. This waiting may contribute to additional drift in the clock and is often unnecessary, since loading the protocol stack and network software is non-user-disruptive. The clock synchronization techniques described herein address this problem, so that when clock synchronization is needed, it is performed at the earliest possible opportunity that does not cause a disruption to the user, i.e., that allows transparency to the user.

Figure 1B:
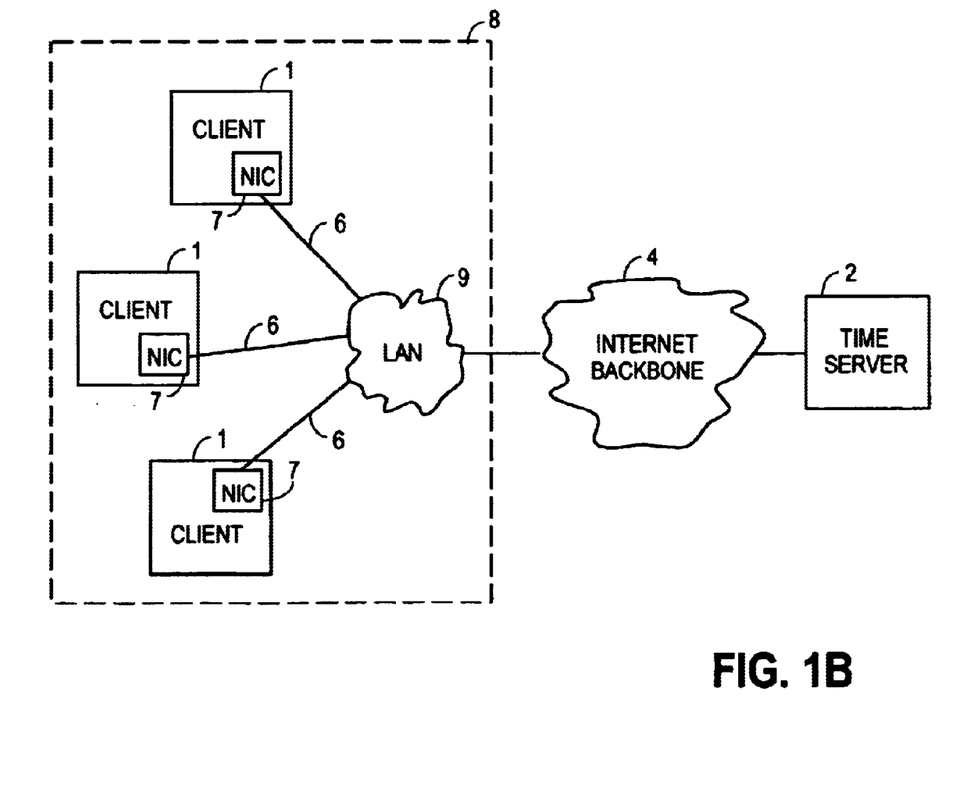
FIG. 1B illustrates multiple client computer systems on a LAN connected to a time server via the Internet.
Figure 2:
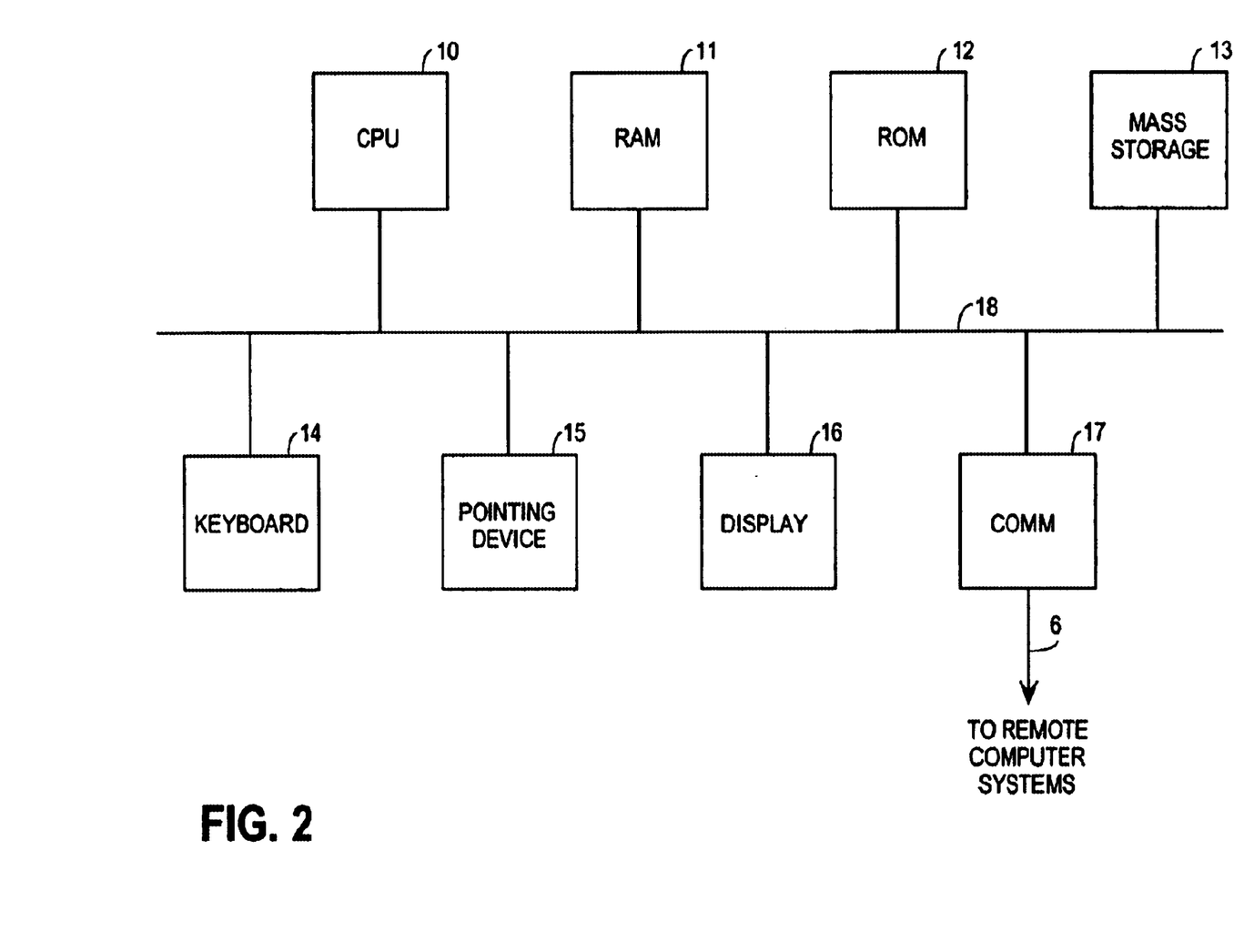
FIG. 2 is a block diagram of the computer system in which the present invention can be implemented.

FIG. 2 is a block diagram of a computer system that is representative of any of the client systems 1 and/or time server 2 in FIGS. 1A and 1B. It will be recognized that many variations can be made upon the illustrated configuration consistent with the techniques described herein. The computer system of FIG. 2 includes a central processing unit (CPU) 10, random access memory (RAM) 11, read-only memory (ROM) 12, each connected to a bus system 18. The bus system 18 may include one or more buses connected to each other through various bridges, controllers and/or adapters, such as are well-known in the art. For example, the bus system may include a system bus that is connected through an adapter to one or more expansion buses, such as a Peripheral Component Interconnect (PCI) bus, Extended Industry Standard Architecture (EISA) bus, or the like. Also coupled to the bus system 18 are a mass storage device 13, a keyboard 14, a pointing device 15, a display device 16, and a communication device 17, which provides the network connection 6.

The pointing device 15 may be any suitable device for enabling a user to position a cursor or pointer on the display device 16, such as a mouse, trackball, touchpad, stylus with light pen, or the like. The display device 16 may be any suitable device for displaying alphanumeric, graphical and/or video data to a user, such as a cathode ray tube (CRT), a liquid crystal display (LCD), or the like, and associated controllers. Mass storage device 13 may include any suitable device for storing large volumes of data, such as a magnetic disk or tape, magneto-optical (MO) storage device, or any of various types of Digital Versatile Disk (DVD) or compact disk ROM (CD-ROM) storage (e.g., CD-R, CD-RW, etc.).

Communication device 17 may be any device suitable for or enabling the computer system to communicate data with a remote computer system over a communication link, such as a conventional telephone (POTS) modem, a cable television modem, an Integrated Services Digital Network (ISDN) adapter, a Digital Subscriber Line (xDSL) adapter, a network interface card (NIC), Ethernet adapter, or the like. Thus, communication device 17 may represent modem 5 or NIC 7 depicted in FIGS. 1A and 1B, respectively.

Some or all aspects of the clock synchronization techniques described herein may be embodied in software. That is, the described techniques may be carried out in a computer system in response to its CPU executing sequences of instructions contained in memory. The instructions may be executed from RAM, for example, and may be loaded from a persistent store, such as a mass storage device and/or from one or more other remote computer systems (collectively referred to as "host computer system"). In the latter case, for example, a host computer system may transmit a sequence of instructions over a network to the ("target") computer system in response to a message transmitted to the host computer system over a network by target computer system. As the target computer system receives the instructions via the network connection, the target computer system stores the instructions in memory. The target computer system may store the instructions for later execution or execute the instructions as they arrive over the network.

In some cases, the downloaded instructions may be directly supported by the CPU of the target computer system. Consequently, execution of the instructions may be performed directly by the CPU. In other cases, the instructions may not be directly executable by the CPU. Under those circumstances, the instructions may be executed by causing the CPU to execute an interpreter that interprets the instructions or by causing the CPU to execute instructions which convert the received instructions to instructions which can be directly executed by the CPU.

In various embodiments, hardwired circuitry may be used in place of, or in combination with, software instructions to implement the described techniques. Thus, the described techniques are not limited to any specific combination of hardware circuitry and software, nor to any particular source for the instructions executed by a computer system.

Figure 3:
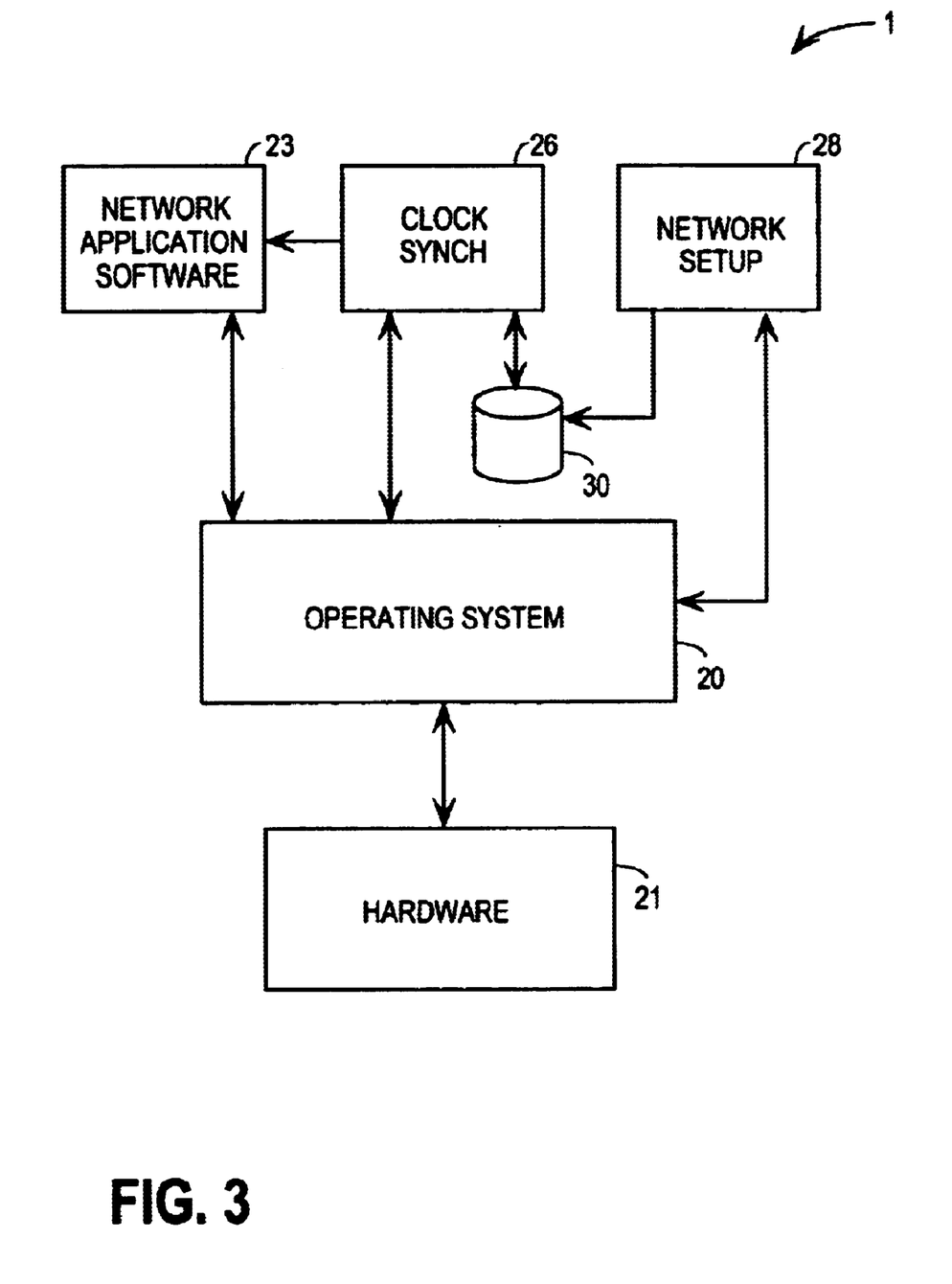
FIG. 3 is a block diagram showing components of a client computer system associated with performing clock synchronization in accordance with the present invention.

FIG. 3 illustrates internal components of a client computer system 1 according to one embodiment. The client computer system 1 includes operating system software 20, which controls the computer system hardware 21 in response to execution of various software applications, including network application software 23. Hardware 21 may represent any or all of the components shown in FIG. 2. Not shown are the various software drivers which enable the operating system 20 to communicate with components of the hardware 21. In a preferred embodiment, the client computer system 1 is an Apple MacIntosh computer system. However, the present invention can also be implemented in other computing platforms and environments, including computers of the so-called personal computer (PC) variety, such as may be based on any of the Windows, OS/2 Warp, or UNIX operating systems, etc.

Network application software 23 is, for purposes of this description, is assumed to be an NTP compliant software application. Accordingly, network application software 23 is configured to, when executed by the client computer system 1, cause the client system 1 to connect to time server 2 via its network connection 6, to obtain an accurate time reading for purposes of synchronizing the internal time clock of client computer system 1.

According to one embodiment, the client computer system 1 further maintains at least two additional software components associated with synchronization of its time clock, namely, clock synchronizer 26 and network setup component 28. In general, clock synchronizer 26 configures the client computer system 1 to determine how often its internal time clock requires synchronization and to determine, when synchronization is required, whether or not it is appropriate to access the network immediately to perform synchronization. The latter determination is made based on information stored in an internal configuration database 30 maintained by client computer system 1. Stored in the configuration database 30 are data indicating the network connection modes that are available to this client computer system 1, as discussed in greater detail below. Clock synchronizer 26 may be implemented as a software application, which operates in the background to other applications. Alternatively, clock synchronizer 26 may be implemented in any of various other forms, such as a component of the network application software 23 or the operating system 26, in hardware, or a combination thereof.

Configuration database 30 stores data indicating the network connection modes that are available to this client computer system 1, including an indication of whether a modem is to be used to establish the network connection. In particular, the data in configuration database 30 indicates the current hardware configuration of the client computer system 1, the software that is currently installed, and the current user settings and/or preferences. When clock synchronization is required, this data is accessed by the clock synchronizer 26 to more precisely control when the clock synchronization takes place. As a result, clock synchronization is performed at the earliest possible opportunity that will not cause a disruption to the user, i.e., the earliest opportunity that will allow a network connection to be established transparently to the user.

Network setup component 28 is responsible for building the configuration database 30. Network setup component 28 is preferably executed to build the database 30 when the client computer system 1 is first initialized, or reinitialized after a change to its hardware or software configuration. According to one embodiment, network setup component 28 is a library, which may be accessed by other components of the client system or by other client systems. Hence, network setup component 28 may alternatively be maintained external to the illustrated client system 1 of FIG. 3, such as in another client system. Network setup component 28 may also be implemented in various other forms, such as a component of the network application software 23 or the operating system 20, in hardware, or a combination thereof.

The particular information included within the configuration database 30 ideally includes information identifying internal modems, input/output (I/O) ports (serial ports and parallel ports), built-in network capabilities of the client system 1, such as Ethernet, token ring, etc., NICs attached to the computer's bus system, and devices attached to I/O ports, such as cable modems, ISDN adapters, etc. It is preferable that the client computer system 1 provides the capability to query for such information. If that is not the case, it may be necessary to build such a list based on the device drivers that are currently installed in the system. Configuration database 30 also preferably includes specific information on the capabilities of the computer system's network hardware resources. Such capabilities may include, for example, type of connection, speed, whether dial-up is required, and whether security is required. For certain resources, the capabilities may be well understood and unambiguous. However, for other resources, such as serial ports, it may be necessary to query the software (e.g., the device drivers) to determine the capabilities. It is preferable that the database 30 include user preferences, which may include whether to allow automatic network connection, or the maximum amount of time to leave a connection open.

There are no particular constraints on the location or format of configuration database 30. Configuration database 30 may be stored, for example, in a mass storage device, RAM, or both, of the client computer system 1. Further, configuration database 30 may be used by other processes that are unrelated to clock synchronization and may therefore include data not associated with clock synchronization.

Thus, when synchronization of the clock is required, clock synchronizer 26 queries configuration database 30 to determine what type of connection is required to do so, provided an active connection does not already exist, to avoid any disruption to the user while also avoiding needless delay in accessing the network. In this context, an "active" network connection means that the client computer system 1 currently is in data communication with another device on the network. Establishing an active network connection, therefore, requires that the appropriate protocol stack be loaded, which may be TCP, for example. Assuming an active connection does not yet exist, then when the default connection mode of the client system I is non-disruptive (e.g., not a modem connection), an active network connection is immediately established to synchronize the time clock. This approach is in contrast with prior art techniques which wait for an active connection to be established, regardless of whether establishing the connection would be disruptive to the user. When the default connection mode is potentially user disruptive, such as when use of a dial out modem is required, then synchronization of the time clock is not performed until an active network connection has been established by some other process. Hence, the above described clock synchronization technique allows the time clock of the client system 1 to be synchronized at the earliest opportunity that will not result in a disruption or inconvenience to the user, while reducing unnecessary delay in synchronizing the clock.

Figure 4:
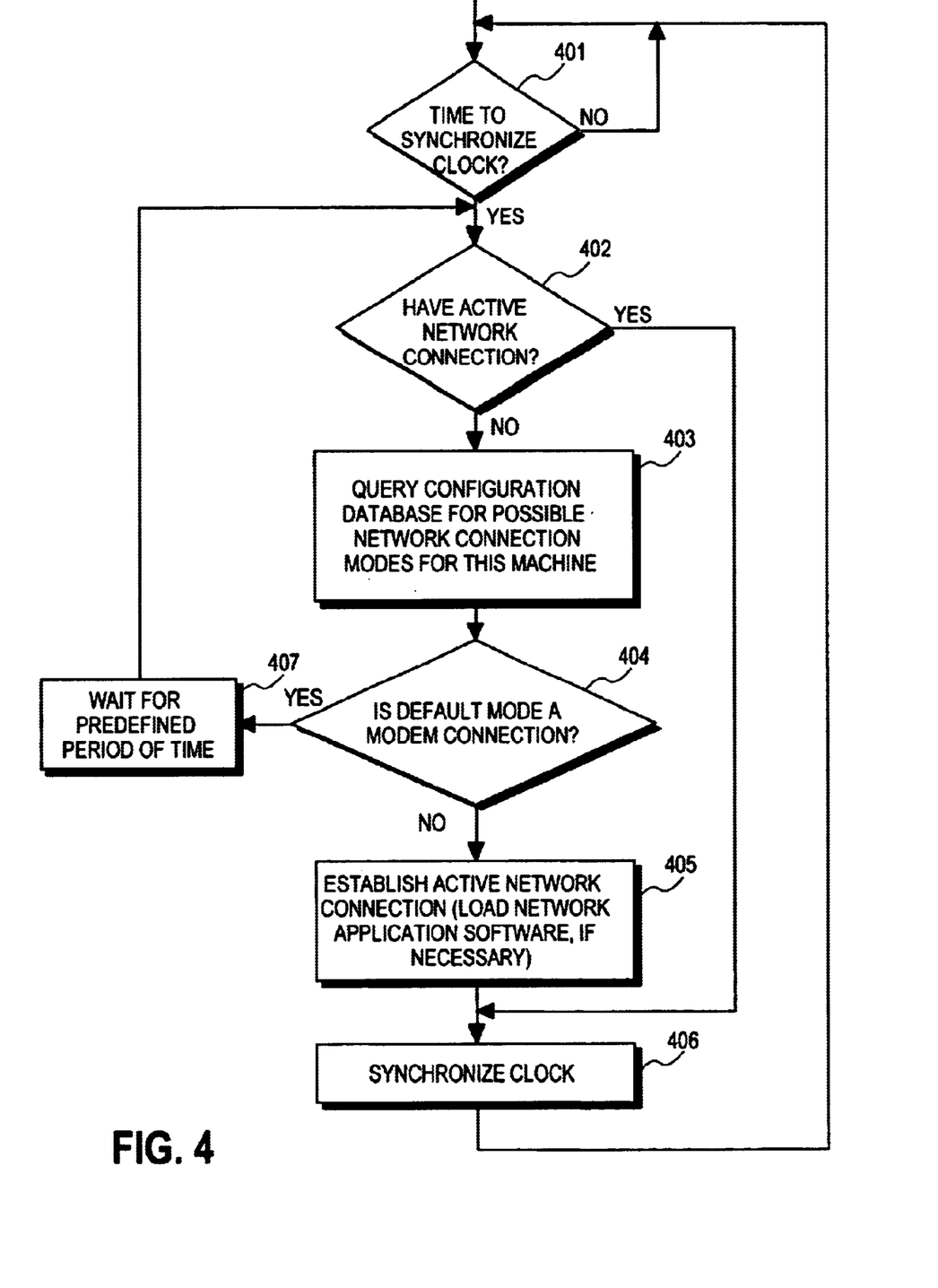
FIG. 4 is a flow diagram illustrating a routine for synchronizing a time clock based on the network connection modes of the computer system.

FIG. 4 illustrates a process that may be implemented by clock synchronizer 26, to perform clock synchronization in accordance with the foregoing description. At 401, when it has been determined that it is time to synchronize the time clock, then it is next determined at 402 whether the client computer system 1 has an active network connection. If the client computer system currently has an active network connection, then the routine proceeds to 406. At 406, the time clock is synchronized by accessing the time server 2 to obtain an accurate time reading. Accessing of the time server 2 may be initiated by clock synchronizer 26 directly, or by clock synchronizer's signaling the network application software 23 to do so.

If the client system 1 does not have an active network connection at 402, then at 403 the configuration database 30 is queried to determine the possible network connection modes for this client system 1. At 404 it is determined whether the default connection mode is potentially disruptive to a user. Specifically, in the illustrated embodiment, it is determined whether the default connection mode requires use of a dial up modem. The default connection mode may be indicated by the stored user preferences, for example. If it is determined that the default connection mode is potentially disruptive (non-transparent), then at 407 the client computer system waits for a predefined period of time before repeating the routine from 402. If the default connection mode is not potentially user disruptive (no dial out is required, or is otherwise transparent to the user), then at 405 an active network is immediately established, which includes loading the appropriate protocol stack, if necessary. Upon establishing an active network connection, the clock is synchronized at 406 by accessing the time server 2 to obtain an accurate time reading. Note that if the configuration database 30 has information regarding permissions on automatic network connections, such information might be used, if appropriate, to deny a clock synchronization in the background if doing so would require initiating a network connection.

Another primary function of clock synchronizer 26 is to determine when synchronization of the time clock is needed. As noted, prior art solutions do not adequately address the problem of overloading a time server with time requests. The following technique, therefore, provides a solution to this problem. In particular, a client computer system, and preferably all client computer systems accessing a given time server, are modified to perform clock synchronization only as often as necessary to maintain the accuracy of the clock within a predefined threshold. This technique is in contrast to prior art synchronization approaches which synchronize the clock at specified time intervals or in response to a specified event (e.g., start-up), without regard to how much the clock has drifted. Note that it is not necessary that this technique be implemented with the above-described technique; either technique may be implemented without the other in a given computer system, if desired. For example, conventional means may be employed to determine when synchronization is needed, if desired.

In accordance with the present need-based synchronization technique, clock synchronizer 26 maintains a history of the amount of drift in the time clock of the client system 1 and determines, based on the history, how often the time clock requires synchronization. The time clock is then synchronized only as often as necessary, as determined by this computation. Thus, a computer system with a small amount of drift in its time clock will access the time server to synchronize its time clock less frequently then a computer system with a large amount of drift in its time clock.

Figure 5:
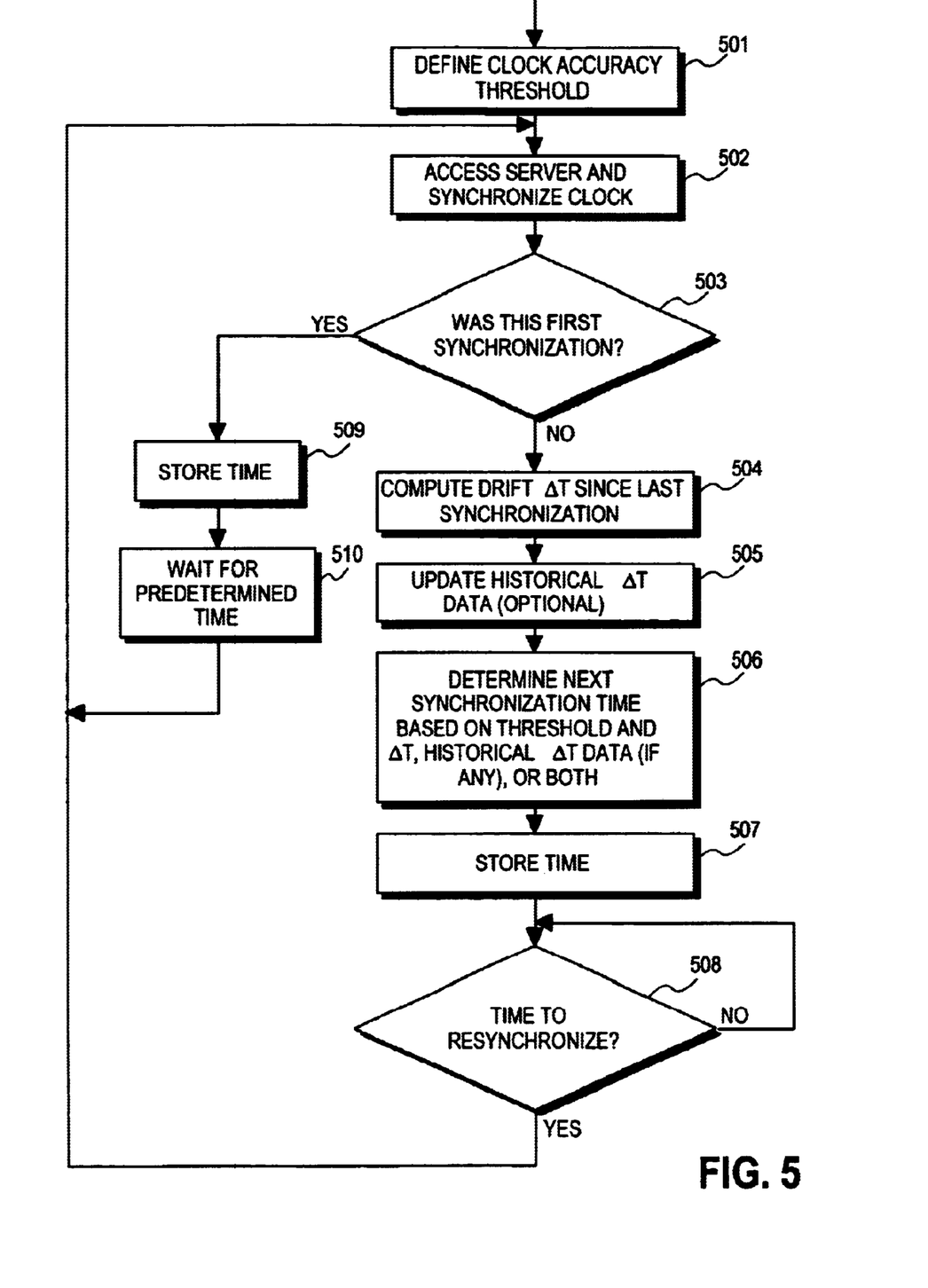
FIG. 5 is a flow diagram illustrating a routine for performing need based synchronization of a computer system time clock.

FIG. 5 illustrates a routine, which may be embodied in clock synchronizer 26, for performing need based clock synchronization as described above. Initially, a minimum acceptable clock accuracy (threshold) is defined at 501. The threshold may determined based on the particular requirements of the machine and its intended uses. Next, at 502 the time server 2 is accessed to obtain a time reading and the internal time clock of the computer system is synchronized based on the time reading. This operation (502) may be performed subject to the constraints described above regarding avoiding disruption to the user. If 502 represented the first instance that clock synchronization was performed by this system, then the routine proceeds to 509, at which the time read back from the server is stored. After storing the time, the client computer system 1 waits for a predetermined period of time, which may be arbitrary, before synchronizing the clock again at 502. After performing a synchronization at 503 other than the first synchronization, the amount of drift $\Delta T$ in the clock since the previous synchronization is then computed at 504. At 505, optionally, a history of multiple $\Delta T$ values for the client computer system 1 is updated. Updating the history may include updating a computation of the average of all previous $\Delta T$ values or some other similarly indicative value. At 506, the next synchronization time is determined based on the defined threshold and based on the computed $\Delta T$, the history of $\Delta T$ data (if any), or both. In this context, determining the next synchronization "time" may be interpreted to mean computing the amount of time until the next synchronization (i.e., the synchronization interval) or computing the specific time and/or date of the next synchronization. Smaller $\Delta T$ values will result in greater amounts of time being allowed until the next synchronization, and vice versa. After determining the next synchronization time, then when it is determined to be time to resynchronize the clock based on the computation of 506, the routine is repeated from 502.

After performing the above routine a number of times, the computed synchronization interval will likely reach a plateau, such that the ideal interval for the client computer system 1 has been determined. From that point, it is unnecessary to continue recomputing the interval according to the above routine; the same interval can be used for each subsequent synchronization. Thus, by using the foregoing technique, a client computer system accesses the time server only when necessary. Accordingly, the loading on a given time server may be reduced by equipping some, and preferably all, of the clients which access the time server with the foregoing functionality.

Note that basing the computation on a history of $\Delta T$ data, rather than just one $\Delta T$ value, may be advantageous in that a computation based on more data may be inherently more accurate. Such an approach may be most useful for a computer system that has a relatively imprecise clock. However, basing the computation on a single $\Delta T$ value may have the advantage of providing more randomness, and therefore more variation, in synchronization times from machine to machine; this effect may further reduce the number of client systems accessing a given time server at the same time.

Figure 6:
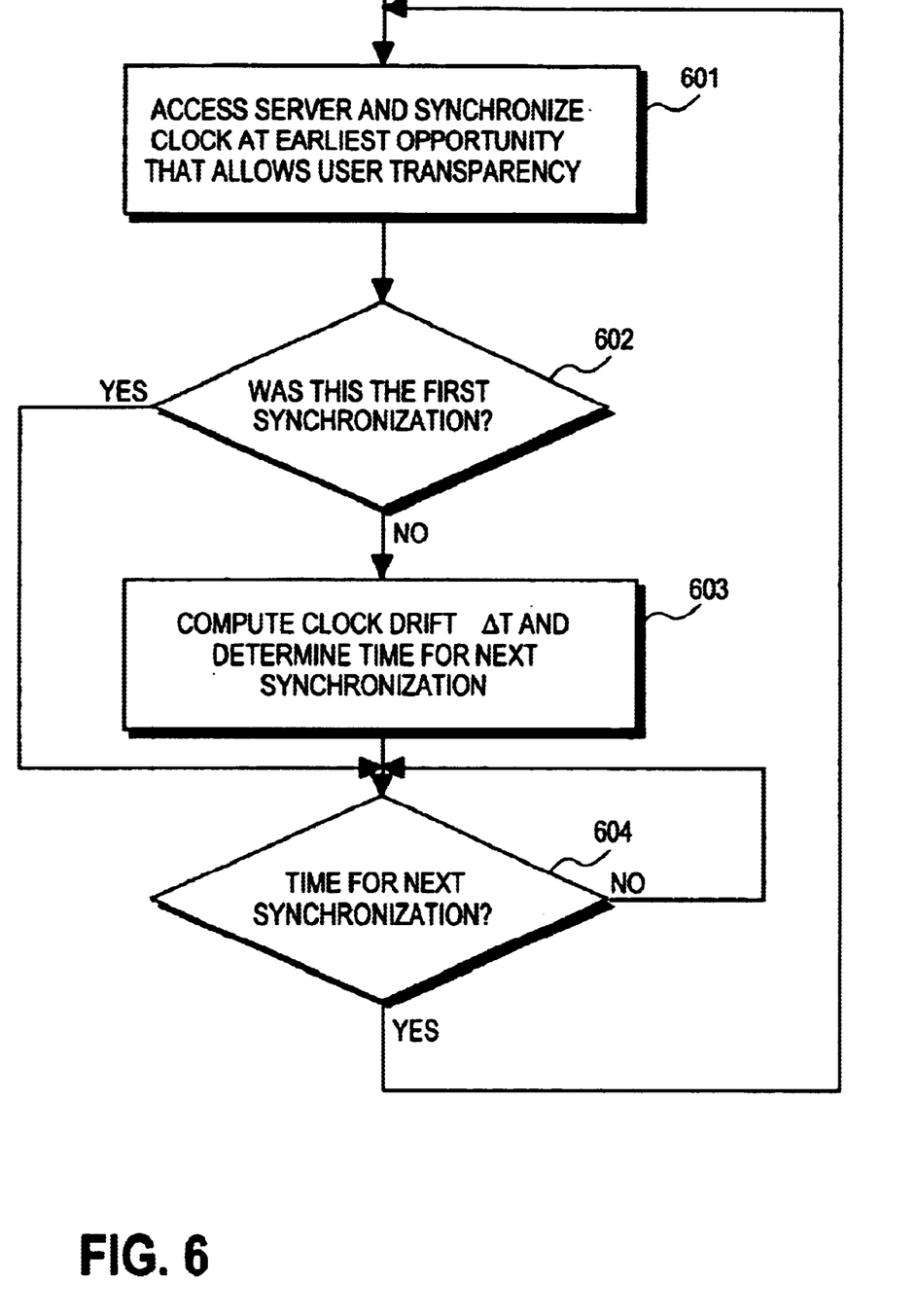
FIG. 6 is a flow diagram illustrating a routine for performing need based synchronization of a computer system time clock based on the network connection modes of the computer system.

The above-described need based clock synchronization and synchronization based on user transparency constraints may be combined in a computer system, as illustrated in FIG. 6. At 601 the time server 2 is accessed and the clock is synchronized at the earliest possible time that allows user transparency to be maintained. At 602, if a synchronization was the first synchronization to be performed, then the routine proceeds to 604 by waiting until it is time to resynchronize the clock. Otherwise, at 603, the amount of drift ΔT in the clock is computed and the time for the next synchronization is computed as described above, after which the routine proceeds to 604. When it is time for the next synchronization, the routine repeats from 601.

The accuracy of the foregoing technique may be reduced when the clock of a client computer system has a lower precision that that of the time server clock. For example, it may be desirable for a client computer system to maintain clock accuracy to within a specified number of microseconds or milliseconds for a given application; yet the clock of the client computer system may only provide precision to the nearest second. Thus, each time the clock is synchronized (i.e., set to a given on-second mark), a substantial amount of drift may be immediately introduced, since the actual time may be many microseconds or milliseconds different from the time to which the clock is set. This effect can be mitigated, however, by providing the clock synchronizer 26 with the capability to implement the following technique. Note that the units of seconds and microseconds are used here only for purposes of description; other units of time may be appropriate for other applications.

Clock synchronizer 26 may be configured to make use of other timing services that are available to the client computer system 1, which are as precise as the time server's clock. Such services are commonly included as part of the operating system or other software of many conventional computer systems and may be used for various precise timing functions. Assume, for example, that the time clock of a client computer system keeps time in seconds, but the client computer system maintains a local timing service which keeps time in microseconds and is independent of the time clock. A reading of N seconds from the time clock of the client computer system does not necessarily equate to N×10⁶ microseconds from the timing service. Accordingly, referring to FIGS. 7A and 7B, the following routine may be performed to synchronize the time clock more precisely.

Figure 7A:
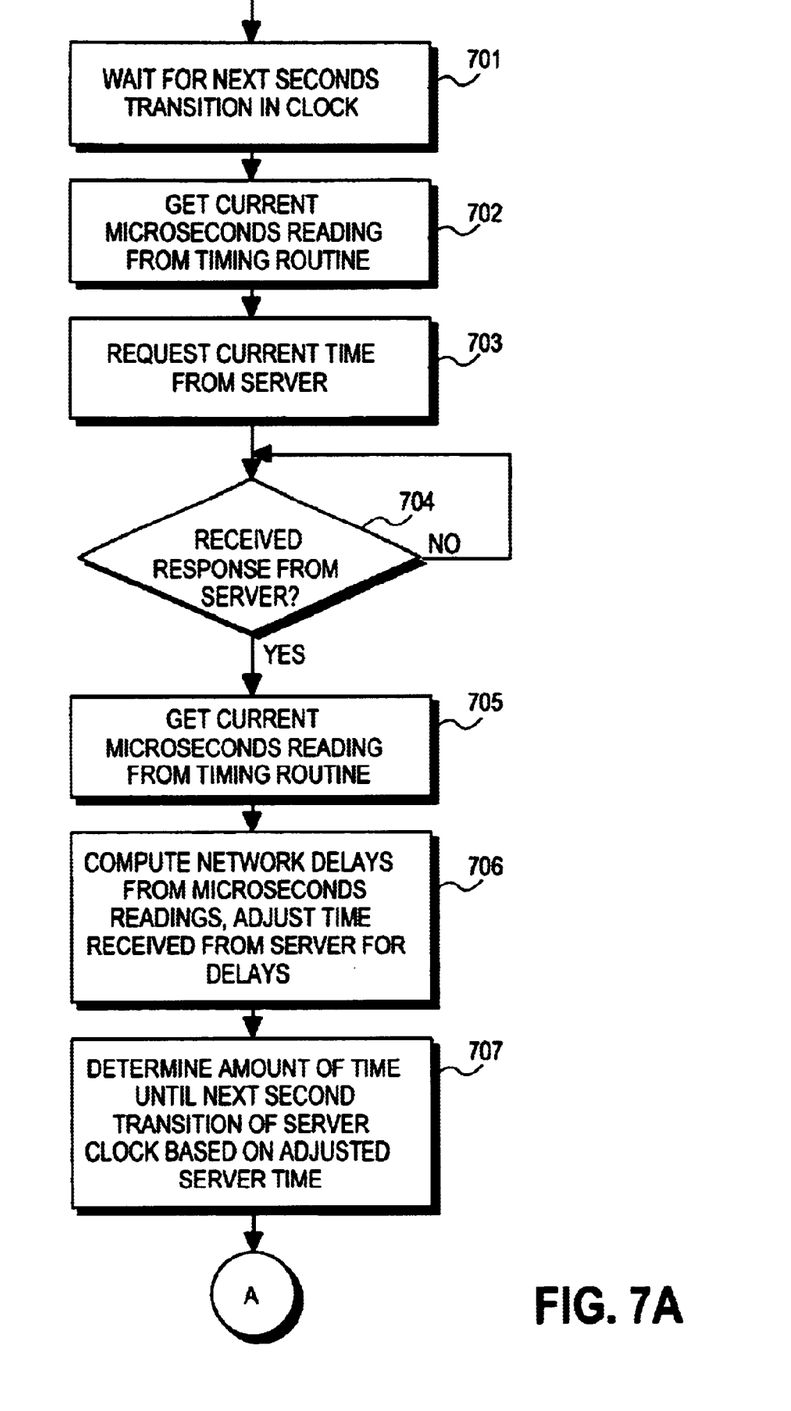
FIGS. 7A and 7B form a flow diagram illustrating a routine for synchronizing an imprecise clock.
Figure 7B:
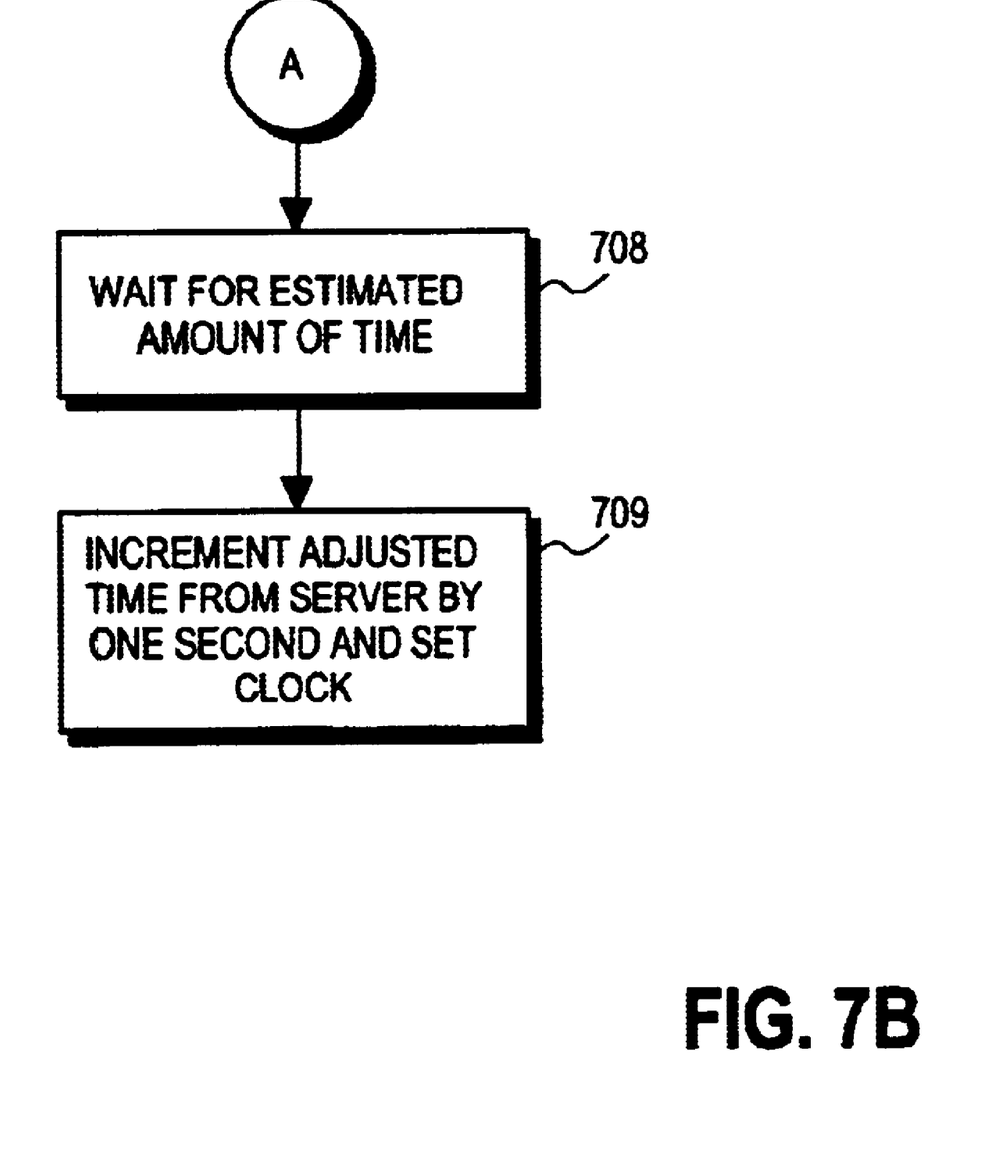

When synchronization is determined to be appropriate, at 701 the client system 1 monitors its clock to determine when the clock transitions from one second to the next. Immediately upon detecting a transition, the system calls the precise timing routine at 702 to obtain the current number of microseconds. Next, or concurrently with 702, the current time is requested from the time server 2 at 703. When the reply is received from the time server 2 (704), the client system 1 again calls the precise timing routine at 705 to obtain the current number of microseconds. The client computer system 1 then estimates at 706 the amount of network delays associated with accessing the server, based on the two microsecond readings of 702 and 705, and adjusts (increases) the time value returned by the time server 2 by the estimated amount. A conventional, published algorithm may be used to estimate the amount of delay; one such algorithm is provided in Internet Request for Comment (RFC) 2030, "Simple Network Time Protocol (SNTP) Version 4 for IPv4, IPv6 and OSI", D. Mills, University of Delaware, October 1996. The client computer system then estimates at 707 how many microseconds to wait until the next transition in seconds on the server clock, based on the adjusted server time. Once this amount of time is computed, the client system 1 waits at 708 for that amount of time. After waiting for the computed amount of time, at 709 the client computer system 1 increments the adjusted server time by one second and sets its internal time clock to that time. At this point, the internal time clock should be within a few microseconds of the server clock, even though it measures time only to the seconds-level of precision.

Special consideration should be given to network delays when synchronizing the clock. As noted above, published algorithms may be used to determine network delays and overhead (e.g., RFC 2030). However, these algorithms also may not be very precise, since it is difficult or impossible to determine exactly how long it took a time server to receive the request and how long it took a client computer system to receive the reply. Accordingly, some amount of error may be unavoidable. Such error may be used advantageously, however, by helping to spread the load on the time server. That is, if the above described need-based synchronization technique is used, any such error may contribute to the randomness in determining when the server is accessed from machine to machine, particularly when the technique uses single ΔT values rather than a history of ΔT values.

Thus, a method and apparatus for performing synchronization of a computer system time clock based on the computer system's network connection modes have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of controlling synchronization of a clock maintained by a processing system, the method comprising:
   determining whether a network connection mode of the processing system is user transparent;
   if the network connection mode is determined not to be user transparent, then accessing a network to synchronize the clock only when the processing system has an active connection to the network; and
   if the connection mode is determined to be user transparent, then establishing an active connection to the network to synchronize the clock when the processor system does not have an active connection to the network.

2. A method according to claim 1, wherein said determining comprises determining whether a default network connection mode of the processing system is user transparent in response to determining a synchronization of the time clock is required.

3. A method according to claim 1, wherein said determining further comprises determining whether a default network connection mode of the processing system is user transparent each time a synchronization of the time clock is required.

4. A method according to claim 1, wherein said determining further comprises determining whether a default network connection mode of the processing system requires activation of a dial-up modem.

5. A method according to claim 4, wherein said determining further comprises determining whether the default network connection mode of the processing system requires activation of a modem.

6. A method according to claim 1, wherein said determining comprises accessing a configuration database of the processing system to identify characteristics of the network connection mode.

7. A method according to claim 1, further comprising:
computing a value indicating an amount of drift of the clock based on a plurality of synchronizations of the clock; and
determining when a next synchronization of the clock is needed based on an outcome of said computing.

8. A computer-implemented method of controlling synchronization of a time clock maintained by a computer system, the method being associated with a clock synchronization process of the computer system, the method comprising:
determining whether a default network connection mode of the computer system requires a user-disruptive action;
if the default network connection mode requires a user-disruptive action, then when the computer system does not have an active connection to a network used to synchronize the time clock, waiting until a process other than the clock synchronization process has established an active connection to the network for the computer system, before accessing a server on the network to synchronize the time clock; and
if the default connection mode does not require a potentially user-disruptive action, then:
immediately establishing an active connection to the network; and
accessing the server to synchronize the time clock.

9. A method according to claim 8, wherein said determining comprises determining whether the default network connection mode of the computer system is user-disruptive in response to determining a synchronization of the time clock is to be performed.

10. A method according to claim 8, wherein said determining further comprises determining whether the default network connection mode of the computer system is user disruptive each time a synchronization of the time clock is to be performed.

11. A method according to claim 8, wherein said determining further comprises determining whether the default network connection mode of the computer system requires activation of a dial-up communication device.

12. A method according to claim 11, wherein said determining further comprises determining whether the default network connection mode of the computer system requires activation of a modem.

13. A method according to claim 8, wherein said determining comprises accessing a configuration database of the processing system.

14. A computer-implemented method of synchronizing a time clock maintained by a computer system, the method comprising:
when a synchronization of the time clock is to be performed, determining whether the computer system has an active connection to a network;
if the computer system has an active connection to the network, then accessing a server on the network to synchronize the time clock;
if the computer system does not have an active connection to the network, then:
determining whether a default network connection mode of the computer system is user-disruptive; and
if the default network connection mode is user-disruptive, then:
waiting until the computer system has an active connection to the network; and
accessing the server to synchronize the time clock only when the computer system has an active connection to the network; and
if the default connection mode is not user-disruptive, then:
immediately establishing an active connection to the network; and
accessing the server to synchronize the time clock.

15. A computer-implemented method of synchronizing a time clock maintained by a computer system, the method comprising:
determining whether the computer system has an active connection to a network each time a synchronization of the time clock is to be performed;
if the computer system has an active connection to the network, then accessing a server on the network to synchronize the time clock;
if the computer system does not have an active connection to the network, then:
determining whether a default network connection mode of the computer system requires activation of a modem by querying a configuration database of the processing system;
if the default network connection mode requires activation of a modem, then waiting until the computer system has an active connection to the network to access the server to synchronize the time clock; and
if the default connection mode does not require activation of a modem, then:
immediately establishing an active connection to the network; and
accessing the server to synchronize the time clock.

16. A computer-implemented method of synchronizing a time clock maintained by a computer system, the method comprising:
when a synchronization of the time clock is to be performed, determining whether the computer system has an active connection to a network;
if the computer system has an active connection to the network, then accessing a server on the network to synchronize the time clock;
if the computer system does not have an active connection to the network, then:
determining whether a default network connection mode of the computer system is user-disruptive; and
if the default network connection mode is user-disruptive, then:
waiting until the computer system has an active connection to the network; and
accessing the server to synchronize the time clock only when the computer system has an active connection to the network; and
if the default connection mode is not user-disruptive, then:
immediately establishing an active connection to the network; and
accessing the server to synchronize the time clock.

17. A computer system comprising:
a processor;
a communication device coupled to the processor for enabling the computer system to communicate on a network; and a storage device coupled to the processor, the storage device having instructions stored therein which configure the processor to:
  determine whether a default network connection mode of the computer system is user-disruptive;
  if the default network connection mode is user-disruptive, then when the computer system does not have an active connection to the network, wait until the computer system has an active connection to the network to access the network to synchronize a time clock maintained by the computer system; and
  if the default connection mode is not user-disruptive, then:
    immediately establish an active connection to the network; and
    access the network to synchronize the time clock.

18. A computer system according to claim 17, wherein the instructions comprise instructions which configure the processor to determine whether the default network connection mode of the computer system is user-disruptive in response to determining that a synchronization of the time clock is to be performed.

19. A computer system according to claim 17, wherein the instructions comprise instructions which configure the processor to determine whether the default network connection mode of the computer system is user-disruptive each time a synchronization of the time clock is to be performed.

20. A computer system according to claim 17, wherein the instructions comprise instructions which configure the processor to determine whether the default network connection mode of the computer system requires activation of a dial-up communication device.

21. A computer system according to claim 20, wherein the instructions further comprise instructions which configure the processor to determine whether the default network connection mode of the computer system requires activation of a modem.

22. A computer system according to claim 17, wherein the instructions comprise instructions which configure the processor to access a configuration database of the processing system.

23. A device for use in a computer system for synchronizing a clock maintained by the computer system, the device comprising:
  means for determining whether a network connection mode of the computer system is user-disruptive;
  means for accessing the network to synchronize the clock only when the computer system has an active connection to the network if the network connection mode is user-disruptive; and
  means for immediately establishing an active connection to the network to synchronize the clock if the connection mode is not user-disruptive and the computer system does not have an active connection to the network.

24. A device according to claim 23, wherein the means for determining comprises means for determining whether a default network connection mode of the computer system is user-disruptive in response to determining a synchronization of the time clock is to be performed.

25. A device according to claim 23, wherein the means for determining further comprises means for determining whether the default network connection mode of the computer system is user-disruptive each time a synchronization of the time clock is to be performed.

26. A device according to claim 23, wherein the means for determining further comprises means for determining whether the default network connection mode of the computer system requires activation of a dial-up communication device.

27. A device according to claim 26, wherein the means for determining further comprises means for determining whether the default network connection mode of the computer system requires activation of a modem.

28. A device according to claim 23, wherein the means for determining comprises means for accessing a configuration database of the processing system.

29. A data signal embodied in a propagation medium, the data signal representing a plurality of instructions which, when executed on a computer system, cause the computer system to:
  determine whether the computer system has an active connection to a network when a synchronization of a time clock maintained by the computer system is to be performed;
  if the computer system has an active connection to the network, then access the network to synchronize the time clock;
  if the computer system does not have an active connection to the network, then:
    determine whether a default network connection mode of the computer system requires a user-disruptive action;
    if the default network connection mode requires a user-disruptive action, then wait until the computer system has an active connection to the network to access the network to synchronize the time clock; and
    if the default connection mode does not require a user-disruptive action, then:
      immediately establish an active connection to the network; and
      access the network to synchronize the time clock.

30. A method of controlling synchronization of a clock maintained by a processing system, the method comprising:
  synchronizing the clock at least twice, said synchronizing including:
    determining whether a network connection mode of the processing system is user transparent;
    if the network connection mode is determined not to be user transparent, then accessing a network to synchronize the clock only when the processing system has an active connection to the network; and
    if the connection mode is determined to be user transparent, then immediately establishing an active connection to the network to synchronize the clock when the processing system does not have an active connection to the network;
  computing a value corresponding to an amount of drift of the clock based on said synchronizing the clock at least twice; and
  determining when to resynchronize the clock based on the computed value.

31. A machine-readable storage medium tangibly embodying sequences of instructions executable by a processing system to perform operations for synchronizing a time clock maintained by the processing system, the operations comprising:
  determining whether a network connection mode of the processing system is user disruptive;
  accessing the network to synchronize the time clock only when the processing system has an active connection to the network if the network connection mode is user-disruptive; and immediately establishing an active connection to the network to synchronize the time clock if the connection mode is not user-disruptive and the processing system does not have an active connection to the network.

32. A machine-readable storage medium according to claim 31, wherein said determining comprises determining whether a default network connection mode of the processing system is user-disruptive in response to determining a synchronization of the time clock is to be performed.

33. A machine-readable storage medium according to claim 32, wherein said determining further comprises determining whether the default network connection mode of the processing system requires activation of a modem.

34. A machine-readable storage medium according to claim 31, wherein said determining comprises accessing a configuration database of the processing system.

* * * * *